(12) United States Patent
Sivakumar et al.

(10) Patent No.: US 8,589,539 B2
(45) Date of Patent: Nov. 19, 2013

(54) MULTIPEER

(75) Inventors: Raghupathy Sivakumar, Alpharetta, GA (US); Aravind Velayutham, Atlanta, GA (US); Zhenyun Zhuang, Atlanta, GA (US)

(73) Assignee: EMC Corporation, Hopkington, MA (US)

( * ) Notice: Subject to any disclaimer, the term of this patent is extended or adjusted under 35 U.S.C. 154(b) by 327 days.

(21) Appl. No.: 12/989,601

(22) PCT Filed: Apr. 27, 2009

(86) PCT No.: PCT/US2009/041786
§ 371 (c)(1),
(2), (4) Date: Jul. 11, 2011

(87) PCT Pub. No.: WO2009/132335
PCT Pub. Date: Oct. 29, 2009

(65) Prior Publication Data
US 2011/0264792 A1    Oct. 27, 2011

Related U.S. Application Data

(60) Provisional application No. 61/125,482, filed on Apr. 25, 2008.

(51) Int. Cl.
*G06F 15/173* (2006.01)
(52) U.S. Cl.
USPC .......................................... 709/224; 709/223

(58) Field of Classification Search
USPC .......... 709/224, 223, 220, 222; 370/252, 256
See application file for complete search history.

(56) References Cited

U.S. PATENT DOCUMENTS

| | | | | |
|---|---|---|---|---|
| 7,454,500 | B1 * | 11/2008 | Hsu et al. | 709/226 |
| 7,657,629 | B1 * | 2/2010 | Kommula | 709/226 |
| 8,260,893 | B1 * | 9/2012 | Bandhole et al. | 709/223 |
| 2003/0158930 | A1 * | 8/2003 | Mc Bride | 709/223 |
| 2003/0229695 | A1 * | 12/2003 | Mc Bride | 709/224 |
| 2005/0039175 | A1 * | 2/2005 | Tatge et al. | 717/156 |
| 2007/0286218 | A1 * | 12/2007 | Zhang et al. | 370/401 |
| 2008/0183865 | A1 * | 7/2008 | Appleby et al. | 709/224 |
| 2008/0198757 | A1 * | 8/2008 | Dan et al. | 370/252 |
| 2009/0164576 | A1 * | 6/2009 | Noh et al. | 709/204 |

FOREIGN PATENT DOCUMENTS

WO    WO 2006126924 A1 *  11/2006

* cited by examiner

*Primary Examiner* — Nicholas Taylor
*Assistant Examiner* — Kostas Katsikis
(74) *Attorney, Agent, or Firm* — Ballard Spahr LLP

(57) ABSTRACT

Provided are methods and systems for creating an optimal set of reflector peers, comprising detecting a plurality of reflector peers, retrieving a plurality of static metrics from each of the plurality of reflector peers, ranking the plurality of reflector peers based on the plurality of static metrics, selecting a top predetermined number of peers from each static metric, establishing the selected reflector peers as the optimal set of reflector peers, determining dynamic metric for each of the plurality of reflector peers, and adjusting the optimal set of reflector peers based on the dynamic metric.

34 Claims, 11 Drawing Sheets

MULTIPEER

CROSS REFERENCE TO RELATED PATENT APPLICATION

This application claims priority to U.S. Provisional Application No. 61/125,482 filed Apr. 25, 2008, herein incorporated by reference in its entirety.

SUMMARY

Provided are methods and systems for creating an optimal set of reflector peers, comprising detecting a plurality of reflector peers, retrieving a plurality of static metrics from each of the plurality of reflector peers, ranking the plurality of reflector peers based on the plurality of static metrics, selecting a top predetermined number of peers from each static metric, establishing the selected reflector peers as the optimal set of reflector peers, determining dynamic metric for each of the plurality of reflector peers, and adjusting the optimal set of reflector peers based on the dynamic metric. Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
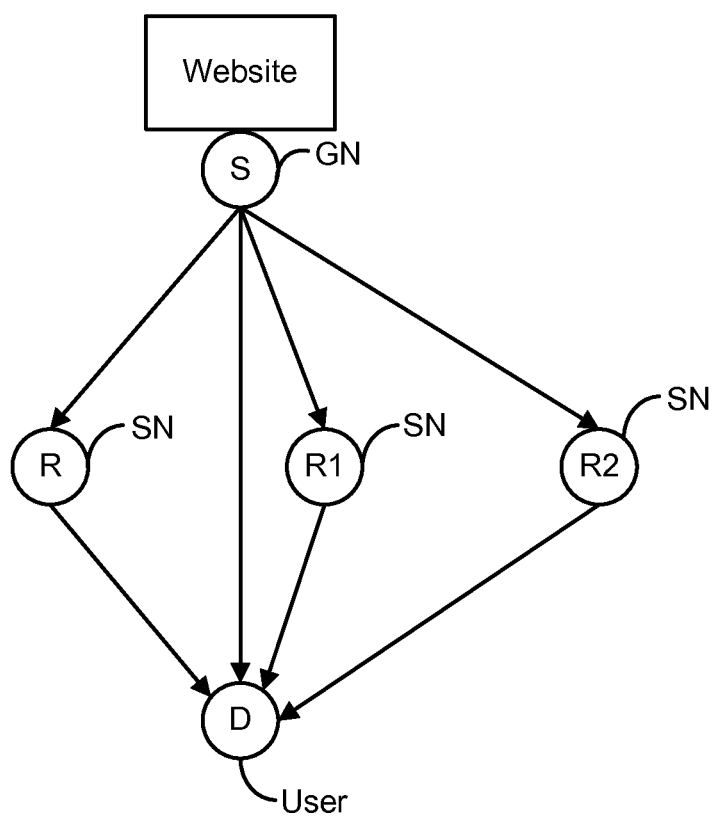
FIG. 1 is an exemplary MultiPeer network.

Before the present methods and systems are disclosed and described, it is to be understood that the methods and systems are not limited to specific synthetic methods, specific components, or to particular compositions. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the Examples included therein and to the Figures and their previous and following description.

In an aspect, the MultiPeer methods and systems (also referred to as simply "Multipeer") provided can enhance end users' performance by selecting an optimal set of reflector peers. A reflector peer can be a computing device, such as a server, a personal computer, and the like. When selecting reflector peers, Multipeer can consider both static and dynamic metrics. For example, static metrics such as service load, link capacity, proximity, Network Address Translators, and ISP (Internet Service Provider) friendliness of reflectors. An example of dynamic metrics includes cache correlation. Multipeer can assist a participating peer (SoftNode or Giganode) to achieve better performance by enabling a Giganode (GN) or Softnode (SN) to select only an optimal subset of reflectors through content can be served. Multipeer can also minimize overhead on GigaNodes. Multipeer can also adapt the peer set to accommodate the dynamics of the network with an opportunistic mechanism. MultiPeer can be used in either direction (GN to SN, or SN to GN) and can be used between different types of peers (GN to GN, or SN to SN).

In one aspect, a network can comprise two types of nodes, GigaNodes (GNs) and SoftNodes (SNs). The GNs can serve as proxies for a web server, as shown in FIG. 1. When a new SN (D) joins the network and requests service from a web server, the GN that resides right before the web server can serve as the proxy GN (S). The proxy GN can service the D by either directly sending data (or a data reference index if the data are cached) to D or commanding other SNs or GNs (e.g., R, R1, R2, referred to as reflectors) to forward data to D.

There can be multiple SNs and GNs in the network. The proxy GN (denoted by S) can select a subset of these SNs and GNs and only direct the SNs and GNs in the subset to serve for a given requesting SN. In an aspect, MultiPeer can comprise, given a set of servicing SNs and a requesting SN (denoted by R), outputting a set of reflectors that comprises k optimal servicing SNs and GNs (denoted by T). For clarity, the SNs and GNs in T can be referred to as reflectors. Throughout, the term reflector and peer can be used interchangeably. The term reflector or peer can be used to generically refer to either an SN or GN. In an aspect, it can be assumed that the value k that determines the size of the reflector set T is known.

In an aspect, when selecting the optimal set of reflectors, MultiPeer can explicitly utilize one or more metrics. For example, MultiPeer can utilize two metrics, namely performance (as experienced by R) and ISP friendliness. The performance metric, measured by the throughput on R, may be of higher priority. The ISP friendliness metric, on the other hand, can be related to ISPs. Since typically ISPs may be concerned with the amount of traffic passing through their gateways, in one embodiment the reflectors may reside in the same ISP network as R. A preference can be made for reflectors in the same ISP network, or for reflectors outside a particular ISP network. MultiPeer may address this concern by explicitly incorporating ISP friendliness metric.

In another aspect, MultiPeer reflector selection can be based on a plurality of metrics associated with each candidate SN. These metrics can comprise one or more of, for example, cache correlation, servicing load, link capacity, proximity, ISP, and NAT (Network Address Translator). In an aspect, the metrics can be prioritized. In one MultiPeer can utilize cache correlation, servicing load, link capacity, proximity, and ISP metrics and can prioritize the metrics in that order. For example, the GNs can be controllers and backup data servers. To scale well, data sending tasks can be offloaded as much as possible. Thus, the peers with data having a high correlation with data on R can be preferred. This metric measures how much cached data a peer has for servicing R. For this reason, cache correlation may be prioritized over other metrics. When a peer with highly correlated cache is selected, MultiPeer can ensure that these peers are capable of sending the cached data. This capability can be determined by two metrics: a peer's current servicing load and the peer's uplink capacity. Thus, these two metrics measure the ability of a peer to send cached data. Since data requested by R can traverse multiple routers and links, the closer peers may be selected in order to reduce the network load and improve R's experienced performance. Thus, the proximity information also can be considered. Since this metric affects the enjoyed performance by R, it can be prioritized over the ISP metric. ISPs typically dislike traffic passing through their gateways. ISPs may impose traffic shaping policies such as bandwidth limiting to save cost. Thus, peers in the same ISP as R can be preferred and peers in particular ISPs can be disfavored.

In another aspect, MultiPeer reflector selection can comprise a Network Translator (NAT) metric. When selecting peers, MultiPeer can be configured to not select peers if such peers are behind the same NAT as the source or destination peer (Giganode or Softnode), or if such peers are behind the same NAT as another peer already chosen to be a member of the peer set.

In an aspect, MultiPeer can comprise one or more components. For example, an Initial Peer Assignment Component, a Cache Correlation Calculation, a Load and Link Capacity Collection, a Peer Proximity Identification, an ISP Detection, a NAT status determination, a Combined Metric Construction, and an Opportunistic Peer Adaptation.

The initial peer assignment component can perform initial reflector assignment. After a reflector joins the network, the proxy GN (S) can create T as quickly as possible. In an aspect, the initial selection of a peer set can be made only based on partial knowledge because only limited information is known during this initial period. The construction of T requires careful consideration for several reasons. First, during the initial stage, the cache correlation degree between R and other peers may not be able to be determined since the calculation of the degree relies upon information in requested data packets, the information of which are not available instantly. Second, even for other metrics such as proximity, the probing for these metrics can take time. Third, the composition of T should be as quick as possible.

In an aspect, the initial peer assignment component can compose groups solely based on four individual metrics including servicing load, link capacity, proximity and ISP. Four separate groups, each of which is composed of the top peers when measured with that specific metric, may be composed. Specifically, the peers may be ranked based on each of the metrics except cache correlation, and are grouped into the top M SNs into metric-specific groups. The result is four groups, namely, servicing overhead group, link capacity group, proximity group, and ISP group. The initial peer assignment component can then select k peers from each of the four groups.

In another aspect, the initial peer assignment component can additionally consider the NAT metric. When considering the NAT metric, a peer is not chosen to the peer set if it is behind the same NAT as the source or destination peers, or it is behind the same NAT as an already chosen peer in the peer set.

Figure 2:
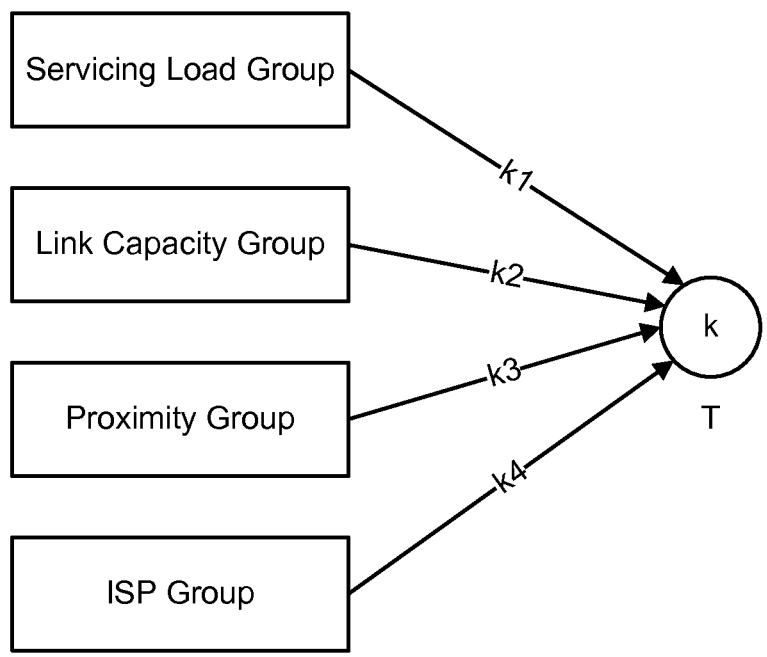
FIG. 2 is an exemplary initial peer assignment.

In an aspect, the composition of T can comprise selecting $k_i$ (1≤i≤4) peers from each group $$\left( \sum_{i=1}^{4} k_i = k \right),$$

as shown in FIG. 2. The values of $k_i$(1≤i≤4) can reflect the priority that a metric can have over other metrics. For example, values can comprise $k_1$=0.4, $k_2$=0.3, $k_3$=0.2, $k_4$=0.1.

Now the individual metrics and their determination and/or retrieval shall be described in greater detail. A cache correlation calculation component can measure a correlation degree of data cached between any two peers. Peers maintain caches of past received data. If a peer has the cache for the data that the R will need, it is desired to include the peer in T.

In an aspect, data packet analysis can be utilized to determine the cache correlation metric. For example, the first packet requested by R can always be sent by the controlling GN S. Once the packet is sent, S can begin the cache correlation calculation process. The process can continue until several requested packets have been used. In the above example, R requests the packets whereas S serves the packets and performs the calculation of the cache correlation metric.

In an aspect, the cache correlation metric can be determined after the first data packet is processed since most applications (e.g. video) request for continuous data. In another aspect, the cache correlation metric can be determined based on more than one data packet. More than one data packet can be used as peers may maintain non-continuous caches due to the dynamic nature of requests and packet-level cache updating processes. Additionally, R may run more than one application simultaneously. Also, applications can exhibit non-continuous behaviors such as fast-forwarding. Thus, the cache correlation metric determination can be a progressive process.

For every requested packet by R, the cache correlation metric between any other peer and R can be obtained. With multiple requested packets, an exponential sliding mechanism can be used to update the cache correlation metric as, $Cor_{cur\_i} = e*Cor_{old\_i} + (1-e)*Cor_{cur\_i}$, where $Cor_{cur\_i} = 1$, if a current packet is correlated with $S_i$; $Cor_{cur\_i} = 0$, otherwise.

The value of e can affect performance. A smaller e value gives higher weight to the correlation determined by the current packet, while a larger e value can smooth the metric value better. With these considerations, and also for the sake of simplicity, e can be any number from 0 to 1, for example, e can be 0.5.

A load and link capacity collection component can obtain the load and uplink capacity of a peer. The load and link capacity collection component can comprise two sub-components, load monitoring and link capacity collection.

The load monitoring sub-component can monitors a peer's servicing load. Since peers may already be serving other peers, when selecting reflectors for R, the process can ensure that no peers will be overloaded. Load metrics for every peer can be maintained on GNs.

The link capacity collection sub-component can measure a peer's uplink capacity. In an aspect, link capacity information can be obtained by active probing. The upload link capacity can be defined as the minimum link capacity of the first two hops or links starting from the SN in the path from the SN to the GN. These link capacities can be measured by using tools such as pathchar, as known in the art. In an aspect, MultiPeer can use sender-only tools to measure the upload link capacity. Sender-only tools have an advantage in that only the sending side is required to run the tool in order to measure capacity.

An alternative to this approach is to use send/receive tools to measure the available bandwidth between any two peers. This approach can provide more accurate values, however, it may be less convenient to use since it requires the coordination of both communication sides.

A peer proximity identification component can identify a location of a peer. For example, each peer may be in different physical locations. The peers that are closer to R can be preferred. In an aspect, proximity information can be obtained by using third-party commercial services such as those provided by, for example, caida.org. Such approaches can operate as follows. A client with an IP address sends a HTTP GET message with an IP address included to a server. The server replies with an HTML response, which includes the proximity information such as city, state, geography information (longitude, latitude). After that, the proximity relationship between peers can be built based on region (city, state), and geography (longitude, latitude).

Another approach is to deploy a stand-alone server that operates an IP-location database. The server can locally maintain the database, accept a TCP request (contains an IP string), and send back a reply containing the proximity information. The database can comprise city, area (state), latitude and longitude. In an aspect, MultiPeer can utilize either or both approaches, or similar approaches.

An ISP detection component can extract information about the ISP network where a peer resides. Provided here are two approaches for collecting ISP information, though other methods can be implemented. One approach can comprise probing using traceroute. This approach makes use of the utility of traceroute (or tracert), as known in the art. Based on traceroute information, the ISP information can be obtained. The SN can issue a traceroute (for Linux systems) or tracert (for Windows systems) command to well known websites such as www.google.com. The responses contain ISP information that can be identified from key strings such as .com and .net. Another approach can comprise utilizing a third-party database that provides ISP information for a given IP address. In an aspect, MultiPeer can utilize either or both approaches, or similar approaches.

A NAT metric component can be obtained determining a NAT router that the peer may be behind. Once the NAT router is determined (through its IP address or otherwise), a peer is not chosen to the peer set if it is behind the same NAT as the source or destination peer or one of the already chosen peers in the peer set.

After values of individual metrics are collected by components as described herein, a combined metric construction factor component can be used to normalize the individual metrics and determine a combined metric construction factor.

Since different metrics may not be able to be compared directly, their values can be normalized before they are used to construct the combined metric construction factor. The purpose of normalization is to map the metric values to a normalized domain of [0, 1] with transformation functions. Though various functions can be designed, in one embodiment MultiPeer can use a simple technique for low computation overhead. Specifically, for metric j, use $Max_j$ to denote the maximum value of all peers. The value of metric j of Deer i can be denoted by $V_{ij}$. The normalized value can be calculated as $$V'_{ij} = \frac{V_{ij}}{Max_j}.$$

Figure 3:
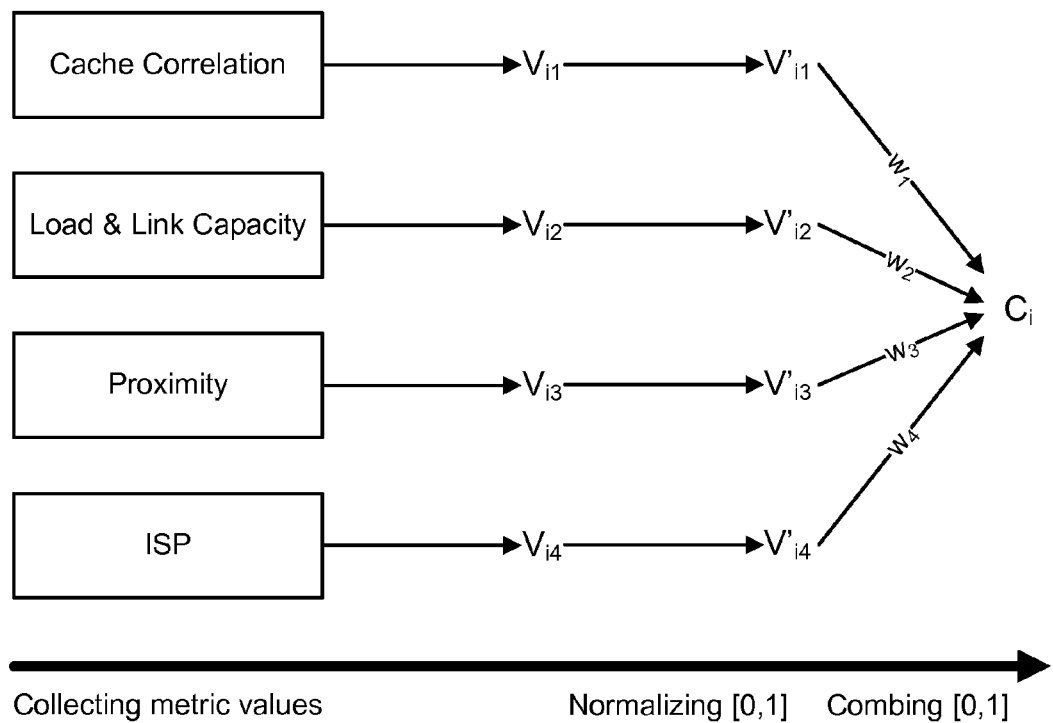
FIG. 3 is an exemplary combined metric construction factor component.

The combined metric construction factor, denoted by C, can be constructed by adding up the weighted values of all the metrics considered, as shown in FIG. 3. Specifically, for peer i, $$C_i = \sum_{j=1}^{4} W_j * V'_{ij},$$

where $W_j$ the weight of metric j ( ) and $$\sum_{j=1}^{4} W_j = 1.$$

Weight assignment can reflect the prioritization of different metrics and ease the computation process. In an aspect, a weight vector of [½, ¼, ⅛, ⅛] can be used, wherein the weight applied to cache correlation metric is ½, the weight applied to load and link capacity metric is ¼, the weight applied to proximity metric is ⅛, and the weight applied to ISP metric is ⅛. Besides reflecting the prioritization of various metrics, this weight assignment also helps quick calculation of the combined factor, since the multiplication involved can be performed using simple bit shifting.

In an aspect, also provided is an opportunistic peer adaptation component. Since both the network condition and available peers may exhibit dynamic behavior, one component of MultiPeer is the ability to adapt to these dynamics. The first question of the adaptation component is when to trigger the adaptation. In MultiPeer, the adaptation can be triggered in one or more ways. For example, to address the dynamic nature of networks, the adaptation can be performed periodically. Additionally, when events occur such that R is experiencing, or is likely to experience, unsatisfying performance, the events can trigger the adaptation. Examples of such events can include, but are not limited to, existence of less than k live reflectors in T, a considerable amount of data are sent directly from GNs, network performance levels dropping below a threshold, data transmissions occurring primarily between a subset of the set of optimal reflector peers, and network performance levels increasing beyond a threshold.

In an aspect, this component can comprise a plurality of subcomponents. For example, opportunistic reflector selecting and combined factor-based replacing. The opportunistic reflector selecting subcomponent can determine a candidate peer to bring in to T, while the subcomponent can determine whether to replace a peer in T with the candidate peer.

Figure 4:
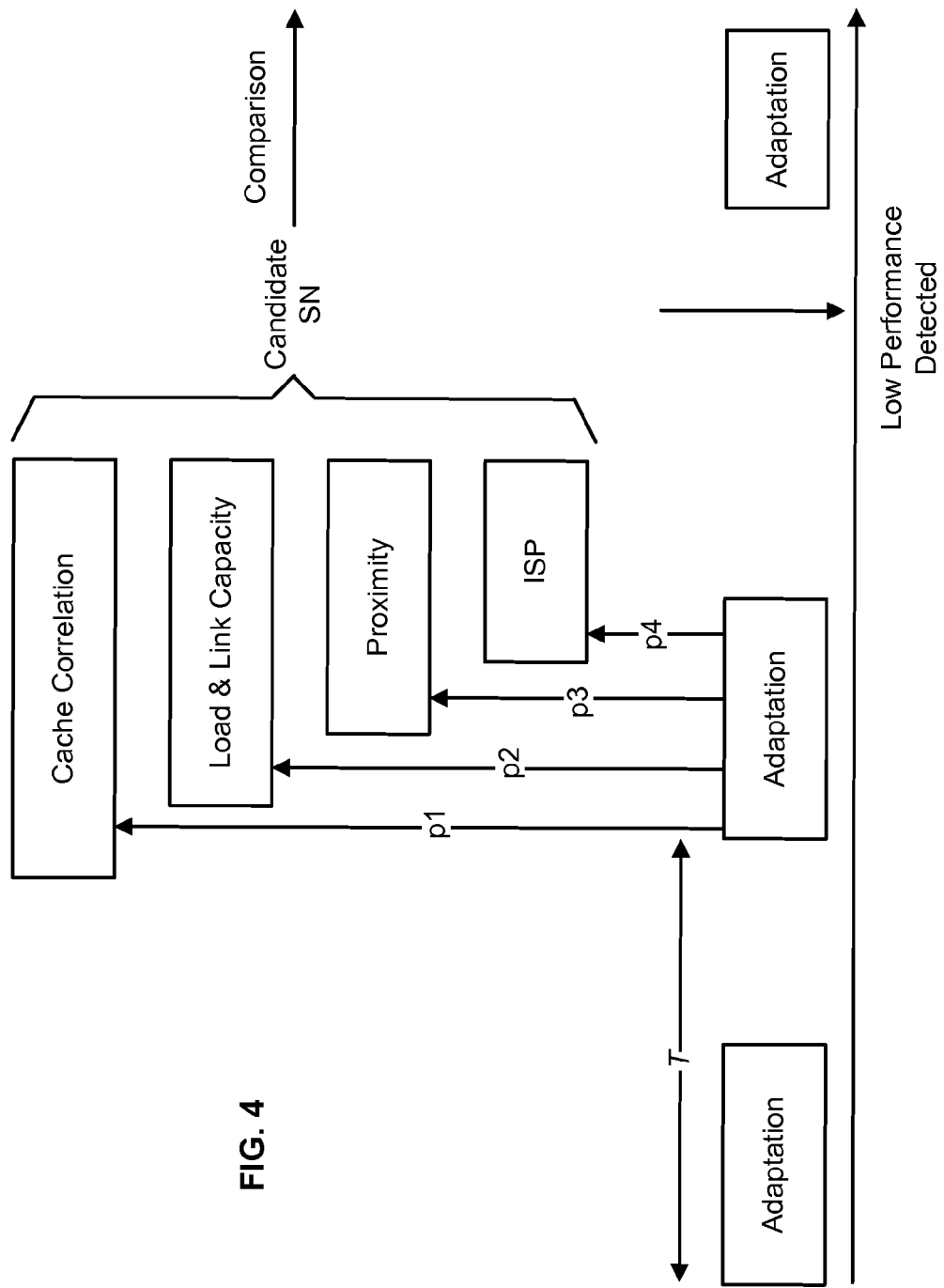
FIG. 4 is an exemplary opportunistic peer adaptation component.

The opportunistic reflector selecting subcomponent, as shown in FIG. 4, can comprise, based on single metric (such as proximity, ISP, load-capacity and cache-correlation), grouping peers into different groups with the top M peers in each group. R can select candidate peers from these groups based on some pre-defined probabilities. To reflect the prioritization concerns discussed previously, the probability values may be adjusted from those previously used to create T. In an aspect, the cache correlation group may be given the largest probability value, while the ISP group may be given the smallest probability. For example, the values for $k_1$ through $k_4$ initially used in calculating T may be adapted and accordingly one metric or another given more priority.

The combined factor-based replacing subcomponent can continually update the combined metric construction factor for one or more peers. In one embodiment, each time the adaptation process runs, after the candidate peer has been selected by the opportunistic reflector selecting subcomponent, the combined factor-based replacing subcomponent can determine whether to add the candidate peer to T or not. The determination can be made based on the comparison of combined metric construction factor values: if the combined metric construction factor value of the candidate peer is larger than at least one reflector in T, the candidate peer can be added to T. After that, if the size of T is larger than k, the peer with the smallest combined metric construction factor value in T can be removed. Therefore, this mechanism can replace the worst peer in T with the candidate peer if the latter proves better.

Figure 5:
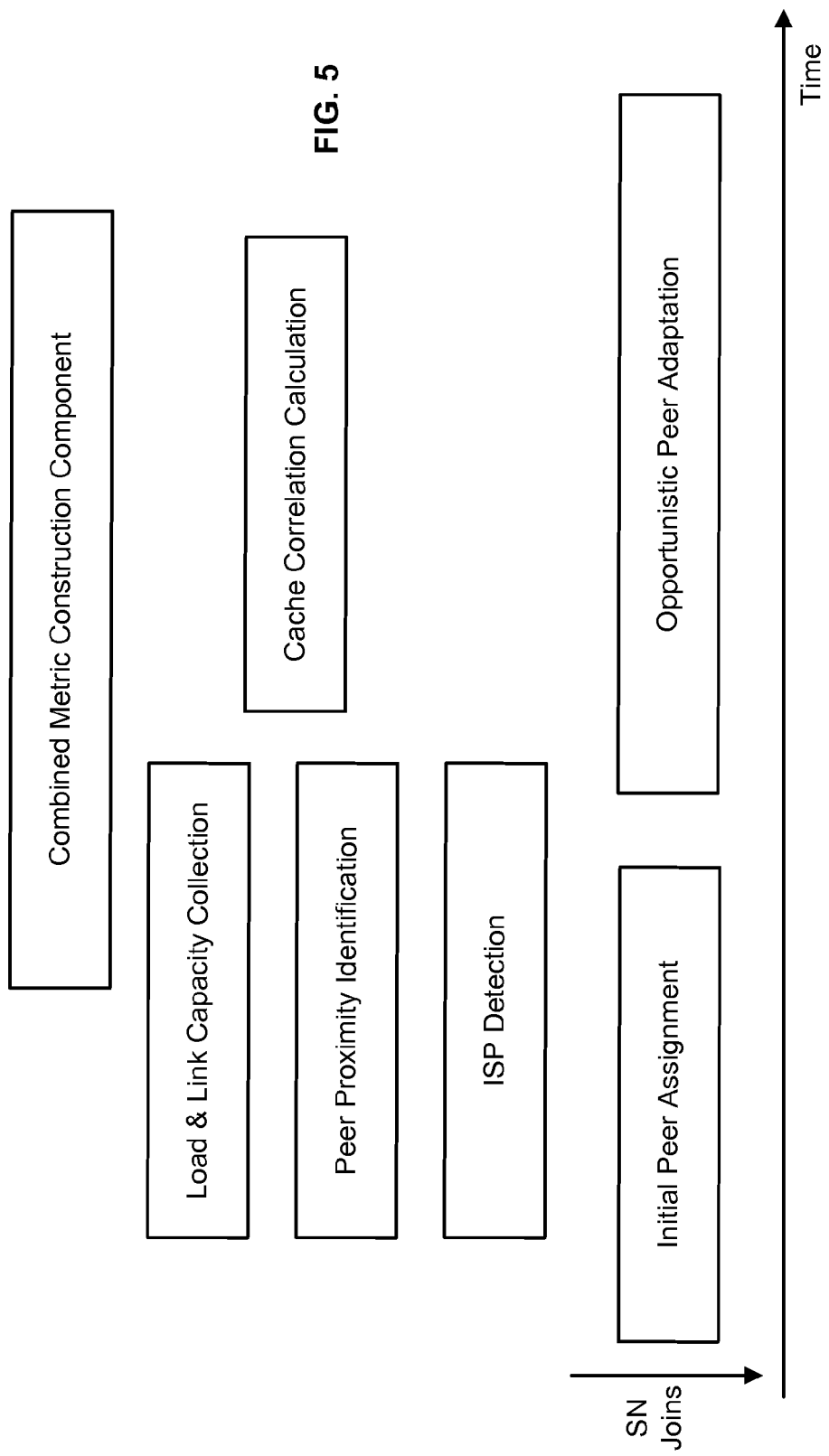
FIG. 5 is an exemplary overview of MultiPeer.

FIG. 5 illustrates an exemplary high-level data path of packets traversing MultiPeer process. After a SN joins the network, three components can collect corresponding individual metric values, and the initial peer assignment component can generate a T with sub-optimal reflectors. Then a cache correlation calculation component can be invoked to determine a cache correlation metric. Then a combined metric construction component can determine combined metric construction factors. These factors can be used by the opportunistic peer adaptation component, which can be invoked multiple times during the SNs entire life.

In an aspect, each session, on start-up, can be assigned a constant number of peers C. The specific peers can be selected based on a peer selection algorithm. All C peers can then be maintained in an "active" list. One instance of C is 1. For every epoch of $T_{epoch}$, the following parameters are measured and maintained (one instance of $T_{epoch}$ is 1 second):

$Q_{avg}$—the average transmission queue size for that period
$P_{over}$—the number of incoming packets for which the queue size was greater than $Q_{max}$ Periodically, at the end of every epoch, if the average transmit queue $Q_{avg}$ of the session is below a minimum threshold $Q_{min}$, the peer that was used the least for that session can be put into an "inactive" list of peers for that session.

If the transmit queue of the session, on the other hand, is higher than a maximum threshold $Q_{max}$, a peer from the "inactive" list can be added back to the "active" list for that session.

If, when trying to add a peer because the queue size is larger than $Q_{max}$, the "inactive" list is empty, a new peer from the common pool of peers can be selected based on the peer selection algorithms to and added directly to the "active" list.

If a peer was added at the end of the last epoch, and the $P_{over}$ value for this epoch is not smaller than that for the last epoch, that peer can be removed from the active list completely.

Peers in the inactive list can be deleted permanently from any association with the session after $T_{inactive}$ continuous epochs they remain in the inactive list.

The total size of the set of active peers can be capped with a size $K_{max}$ at the higher end and a size $K_{min}$ at the lower end. For example, $K_{max}$ can be any number between 1 and 1000000. For example, $K_{min}$ can be any number between 1 and 1000. Examples of $K_{max}$ and $K_{min}$ can be 10 and 1 respectively.

Figure 6:
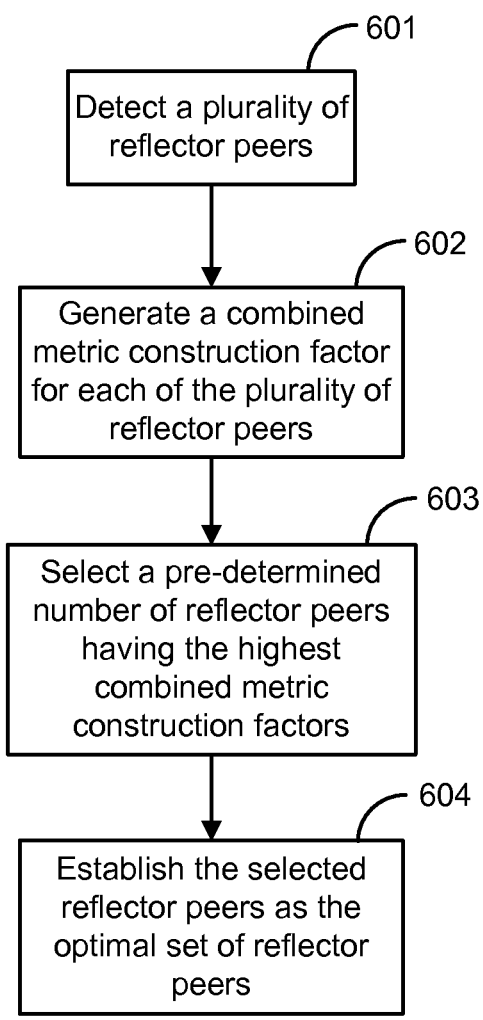
FIG. 6 is an exemplary method for creating an optimal set of reflector peers.

Accordingly, illustrated in FIG. 6, provided are methods for creating an optimal set of reflector peers, comprising detecting a plurality of reflector peers at 601, generating a combined metric construction factor for each of the plurality of reflector peers at 602, selecting a pre-determined number of reflector peers having the highest combined metric construction factors at 603, and establishing the selected reflector peers as the optimal set of reflector peers at 604.

Generating a combined metric construction factor for each of the plurality of reflector peers can comprise performing initial peer assignment on the plurality of reflector peers.

Performing initial peer assignment on the plurality of reflector peers can comprise retrieving a servicing load metric for each of the plurality of reflector peers, retrieving a link capacity metric for each of the plurality of reflector peers, retrieving a proximity metric for each of the plurality of reflector peers, retrieving an Internet Service Provider (ISP) metric for each of the plurality of reflector peers, retrieving a Network Address Translator (NAT) metric for each of the plurality of peers, ranking the plurality of reflector peers based on each of the servicing load metric, link capacity metric, proximity metric, ISP metric, and NAT metric, selecting a top predetermined number of peers from each metric, and establishing the selected reflector peers as the optimal set of reflector peers. In an aspect, the metrics can be known apriori for a peer and thus, retrieved. In another aspect, the metrics can be determined anew.

Retrieving a servicing load metric for each of the plurality of reflector peers can comprise determining a number of peers served by each peer. Retrieving a link capacity metric for each of the plurality of reflector peers can comprise actively probing to determine a minimum link capacity of two peers away from each peer. Retrieving a proximity metric for each of the plurality of reflector peers can comprise determining an Internet Protocol (IP) address for each the plurality of reflector peers and correlating each IP address with an IP address geo-location database to determine a physical location for each of the plurality of reflector peers. Retrieving an Internet Service Provider (ISP) metric for each of the plurality of reflector peers can comprise actively probing to determine a route taken by data packets and extracting ISP information. Retrieving a NAT metric for each of the plurality of peers can comprise determining whether each peer is behind a NAT device and if a peer is behind a NAT device, determining a number of peers behind the NAT device Generating a combined metric construction factor for each of the plurality of reflector peers can comprise determining a cache correlation metric for each of the plurality of reflector peers. The cache correlation metric is determined based on receipt of one data packet. The cache correlation metric can be determined based on receipt of a plurality of data packets, wherein the cache correlation metric is updated according to $Cor_{cur\_i}=e*Cor_{old\_i}+(1-e)*Cor_{cur\_i}$, wherein $Cor_{cur\_i}$ represents a current cache correlation metric, $Cor_{old\_i}$ represents a previous cache correlation metric, and e represents a weighting factor, $Cor_{cur\_i}=1$ if a current packet is correlated between two reflector peers, otherwise $Cor_{cur\_i}=0$ Generating a combined metric construction factor for each of the plurality of reflector peers can comprise, for each of the plurality of reflector peers, normalizing each servicing load metric, link capacity metric, proximity metric, ISP metric, and cache correlation metric according to $V_{ij}'=V_{ij}/Max_j$, wherein the value of metric j of peer i is denoted by $V_{ij}$ and $Max_j$ is the maximum value of all peers for metric j.

Generating a combined metric construction factor for each of the plurality of reflector peers can comprise applying a weight to each normalized metric value and for each of the plurality of reflector peers, adding the weighted normalized metric values associated with that peer.

The methods can be periodically repeated. The methods can be repeated based on the occurrence of a network event. The network event can comprise one or more of, network performance levels dropping below a threshold, offline reflector peers, data transmissions occurring primarily between a subset of the set of optimal reflector peers, and network performance levels increasing beyond a threshold.

Figure 7:
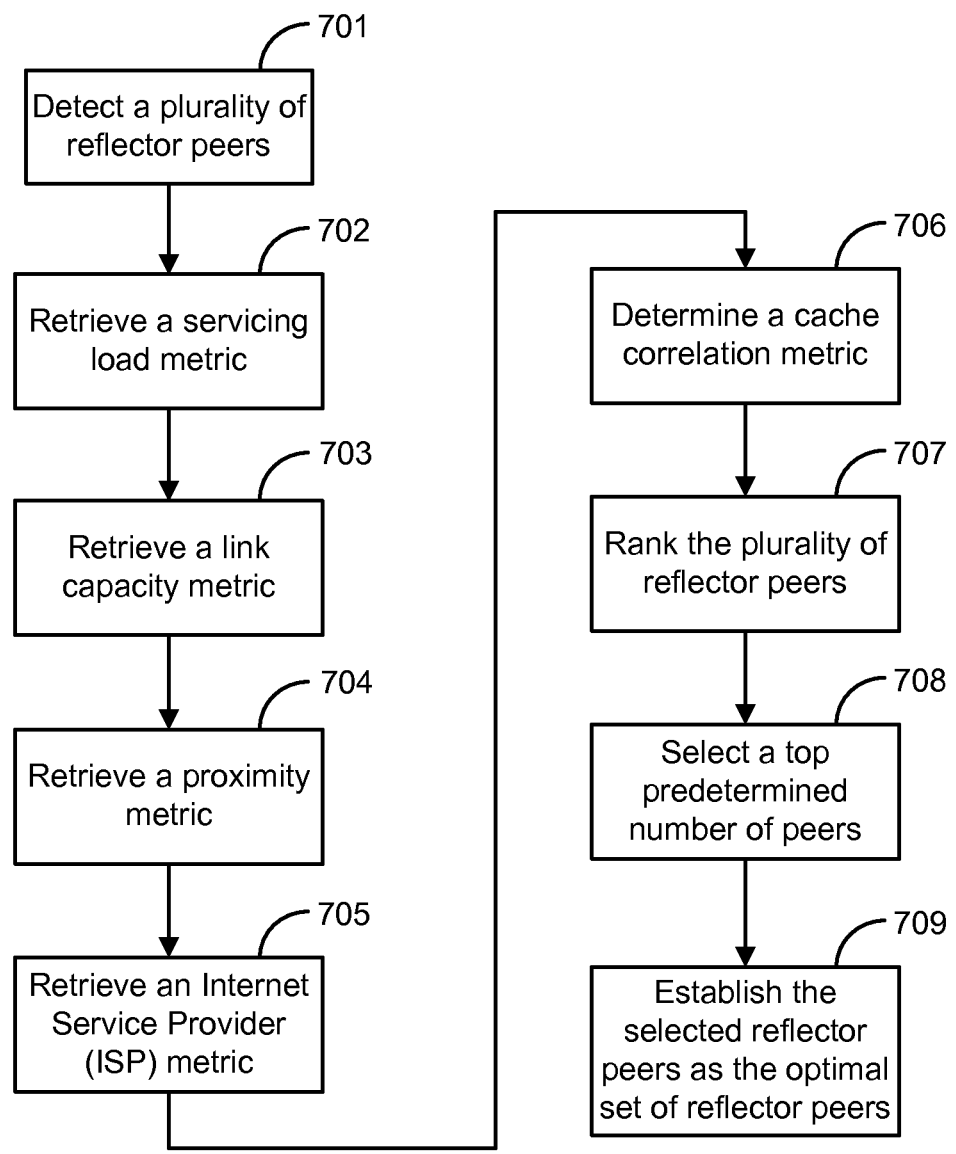
FIG. 7 is another exemplary method for creating an optimal set of reflector peers.

In another aspect, illustrated in FIG. 7, provided are methods for creating an optimal set of reflector peers, comprising detecting a plurality of reflector peers at 701, retrieving a servicing load metric for each of the plurality of reflector peers at 702, retrieving a link capacity metric for each of the plurality of reflector peers at 703, retrieving a proximity metric for each of the plurality of reflector peers at 704, retrieving an Internet Service Provider (ISP) metric for each of the plurality of reflector peers at 705, determining a cache correlation metric for each of the plurality of reflector peers at 706, ranking the plurality of reflector peers based on each of the servicing load metric, link capacity metric, proximity metric, ISP metric, and cache correlation metric at 707, selecting a top predetermined number of peers from each metric at 708, and establishing the selected reflector peers as the optimal set of reflector peers at 709.

Retrieving a servicing load metric for each of the plurality of reflector peers can comprise determining a number of peers served by each peer. Retrieving a link capacity metric for each of the plurality of reflector peers can comprise actively probing to determine a minimum link capacity of two peers away from each peer. Retrieving a proximity metric for each of the plurality of reflector peers can comprise determining an Internet Protocol (IP) address for each the plurality of reflector peers and correlating each IP address with an IP address geo-location database to determine a physical location for each of the plurality of reflector peers. Retrieving an Internet Service Provider (ISP) metric for each of the plurality of reflector peers can comprise actively probing to determine a route taken by data packets and extracting ISP information. In an aspect, the metrics can be known apriori for a peer and thus, retrieved. In another aspect, the metrics can be determined anew.

The cache correlation metric can be determined based on receipt of a plurality of data packets, wherein the cache correlation metric is updated according to $Cor_{cur\_i}=e*Cor_{old\_i}+(1-e)*Cor_{cur\_i}$, wherein $Cor_{cur\_i}$ represents a current cache correlation metric, $Cor_{old\_i}$ represents a previous cache correlation metric, and e represents a weighting factor, $Cor_{cur\_i}=1$ if a current packet is correlated between two reflector peers, otherwise $Cor_{cur\_i}=0$.

The methods can further comprising determining a NAT metric for each of the plurality of peers and ranking the plurality of reflector peers based on each of the servicing load metric, link capacity metric, proximity metric, ISP metric, cache correlation metric, and NAT metric. Retrieving a NAT metric for each of the plurality of peers can comprise determining whether each peer is behind a NAT device and if a peer is behind a NAT device, determining a number of peers behind the NAT device The methods can further comprise generating a combined metric construction factor for each of the plurality of reflector peers and adjusting the optimal set of reflector peers based on the combined metric construction factor.

Generating a combined metric construction factor for each of the plurality of reflector peers can comprise, for each of the plurality of reflector peers, normalizing each servicing load metric, link capacity metric, proximity metric, ISP metric, cache correlation metric, and NAT metric according to $V_{ij}'=V_{ij}/Max_j$, wherein the value of metric j of peer i is denoted by $V_{ij}$ and $Max_j$ is the maximum value of all peers for metric j.

Generating a combined metric construction factor for each of the plurality of reflector peers can comprise applying a weight to each normalized metric value and for each of the plurality of reflector peers, adding the weighted normalized metric values associated with that peer.

The methods can be periodically repeated. The methods can be repeated based on the occurrence of a network event. The network event can comprise one or more of, network performance levels dropping below a threshold, offline reflector peers, data transmissions occurring primarily between a subset of the set of optimal reflector peers, and network performance levels increasing beyond a threshold.

Figure 8:
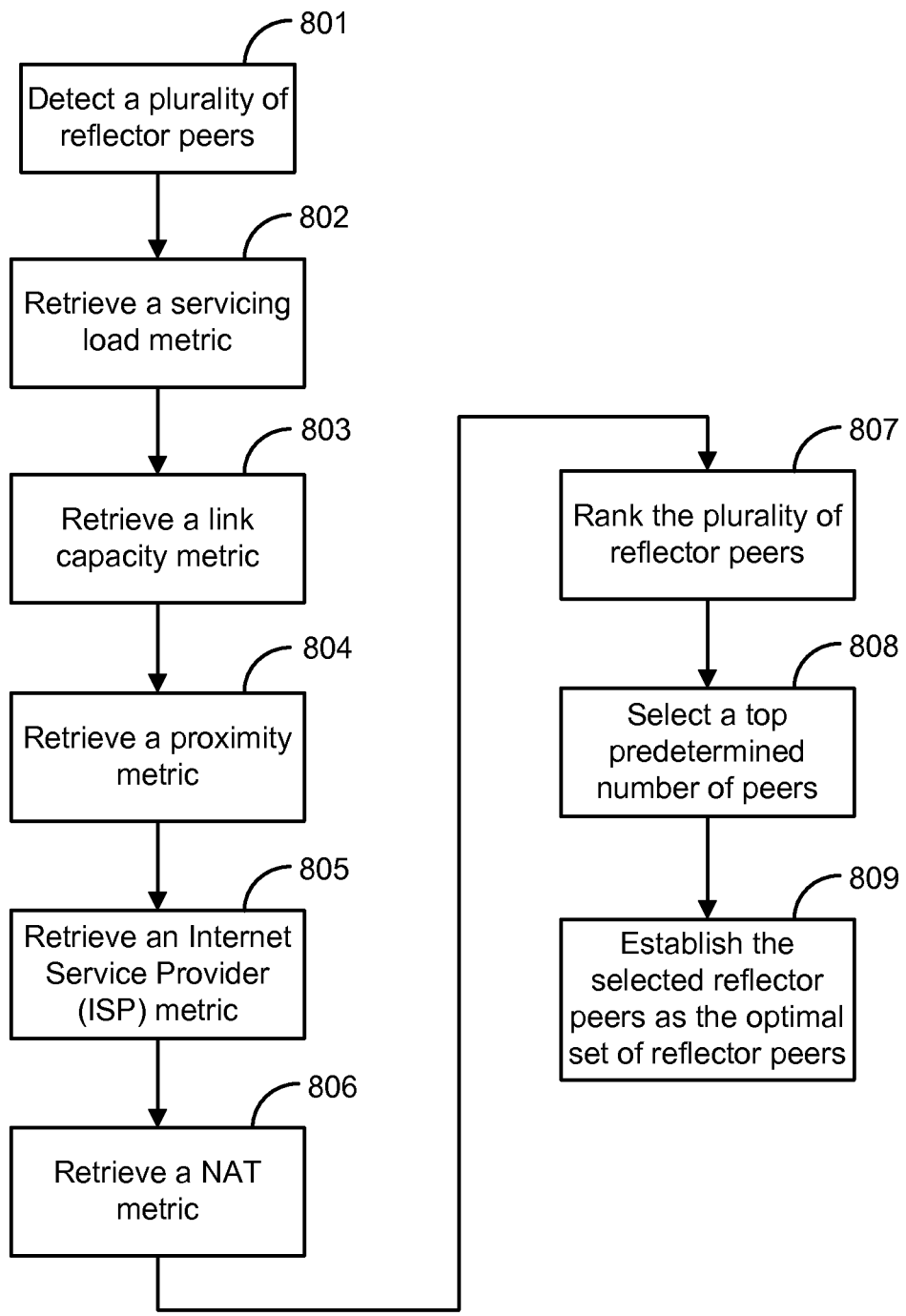
FIG. 8 is another exemplary method for creating an optimal set of reflector peers.

In yet another aspect, illustrated in FIG. 8, provided are methods for creating an optimal set of reflector peers, comprising detecting a plurality of reflector peers at 801, retrieving a servicing load metric for each of the plurality of reflector peers at 802, retrieving a link capacity metric for each of the plurality of reflector peers at 803, retrieving a proximity metric for each of the plurality of reflector peers at 804, retrieving an Internet Service Provider (ISP) metric for each of the plurality of reflector peers at 805, retrieving a NAT metric for each of the plurality of peers at 806, ranking the plurality of reflector peers based on each of the servicing load metric, link capacity metric, proximity metric, ISP metric, and NAT metric at 807, selecting a top predetermined number of peers from each metric at 808, and establishing the selected reflector peers as the optimal set of reflector peers at 809. In an aspect, the metrics can be known apriori for a peer and thus, retrieved. In another aspect, the metrics can be determined anew.

The methods can further comprise determining a cache correlation metric for each of the plurality of reflector peers and adjusting the optimal set of reflector peers based on the cache correlation metric.

The methods can further comprise determining a combined metric construction factor for each of the plurality of reflector peers based on the servicing load metric, link capacity metric, proximity metric, ISP metric, cache correlation metric, and NAT metric and adjusting a the optimal set of reflector peers based on the combined metric construction factors.

The methods can be periodically repeated. The methods can be repeated based on the occurrence of a network event. The network event can comprise one or more of, network performance levels dropping below a threshold, offline reflector peers, data transmissions occurring primarily between a subset of the set of optimal reflector peers, and network performance levels increasing beyond a threshold.

Figure 9:
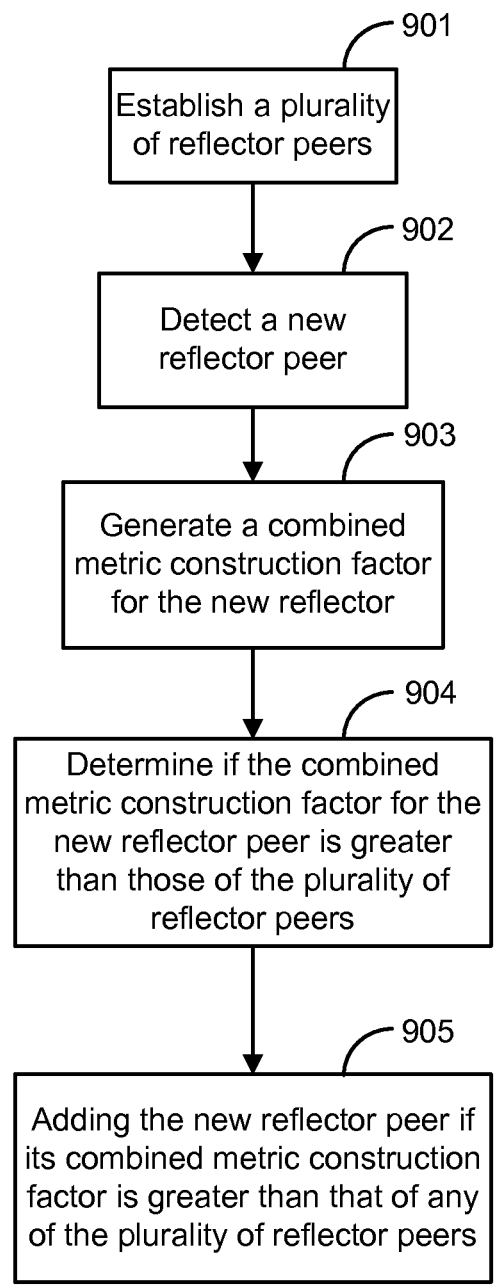
FIG. 9 is an exemplary method for maintaining an optimal set of reflector peers.

In another aspect, illustrated in FIG. 9, provided are methods for maintaining an optimal set of reflector peers, comprising establishing a plurality of reflector peers, wherein the plurality of reflector peers each have a combined metric construction factor and the plurality of reflector peers represent an optimal set of reflector peers at 901, detecting a new reflector peer at 902, generating a combined metric construction factor for the new reflector peer at 903, determining if the combined metric construction factor for the new reflector peer is greater than any of the combined metric construction factors for the plurality of reflector peers at 904, and if the combined metric construction factor for the new reflector peer is greater than any of the combined metric construction factors for the plurality of reflector peers, adding replacing one of the plurality of reflector peers having the lowest combined metric construction factor with the new reflector peer in the optimal set of reflector peers at 905.

Generating a combined metric construction factor for the new reflector peer can comprise retrieving a servicing load metric for the new reflector peer, retrieving a link capacity metric for the new reflector peer, retrieving a proximity metric for the new reflector peer, retrieving an Internet Service Provider (ISP) metric for the new reflector peer, retrieving a NAT metric for the new reflector peer, and determining a cache correlation metric the new reflector peer.

Generating a combined metric construction factor for the new reflector peer can comprise, normalizing the servicing load metric, link capacity metric, proximity metric, ISP metric, cache correlation metric, and NAT metric according to $V_{ij}'=V_{ij}/Max_j$, wherein the value of metric j of peer i is denoted by $V_{ij}$ and $Max_j$ is the maximum value of all peers for metric j.

Generating a combined metric construction factor for each of the plurality of reflector peers can comprise applying a weight to each normalized metric value and for the new reflector peer, adding the weighted normalized metric values associated with the new reflector peer.

Figure 10:
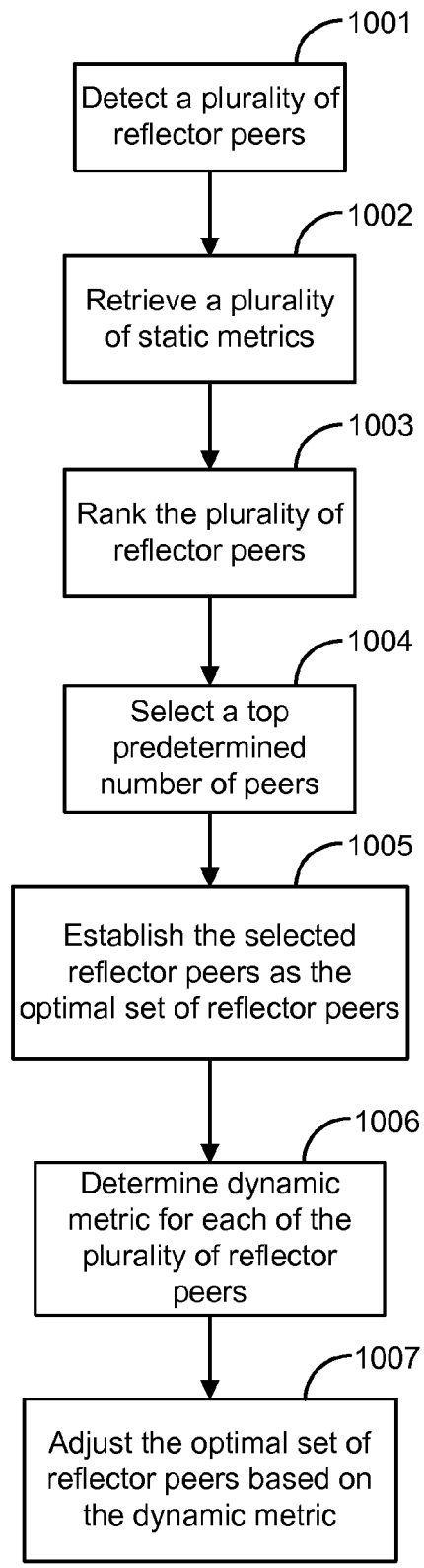
FIG. 10 is another exemplary method for creating an optimal set of reflector peers.

In another aspect, illustrated in FIG. 10, provided are methods for creating an optimal set of reflector peers, comprising detecting a plurality of reflector peers at 1001, retrieving a plurality of static metrics from each of the plurality of reflector peers at 1002, ranking the plurality of reflector peers based on the plurality of static metrics at 1003, selecting a top predetermined number of peers from each static metric at 1004, establishing the selected reflector peers as the optimal set of reflector peers at 1005, determining dynamic metric for each of the plurality of reflector peers at 1006, and adjusting the optimal set of reflector peers based on the dynamic metric at 1007.

Retrieving a plurality of static metrics from each of the plurality of reflector peers can comprise retrieving one or more of, a servicing load metric, a link capacity metric, a proximity metric, an Internet Service Provider (ISP) metric, and a NAT metric. Determining dynamic metric for each of the plurality of reflector peers can comprise determining a cache correlation metric for each of the plurality of reflector peers.

Figure 11:
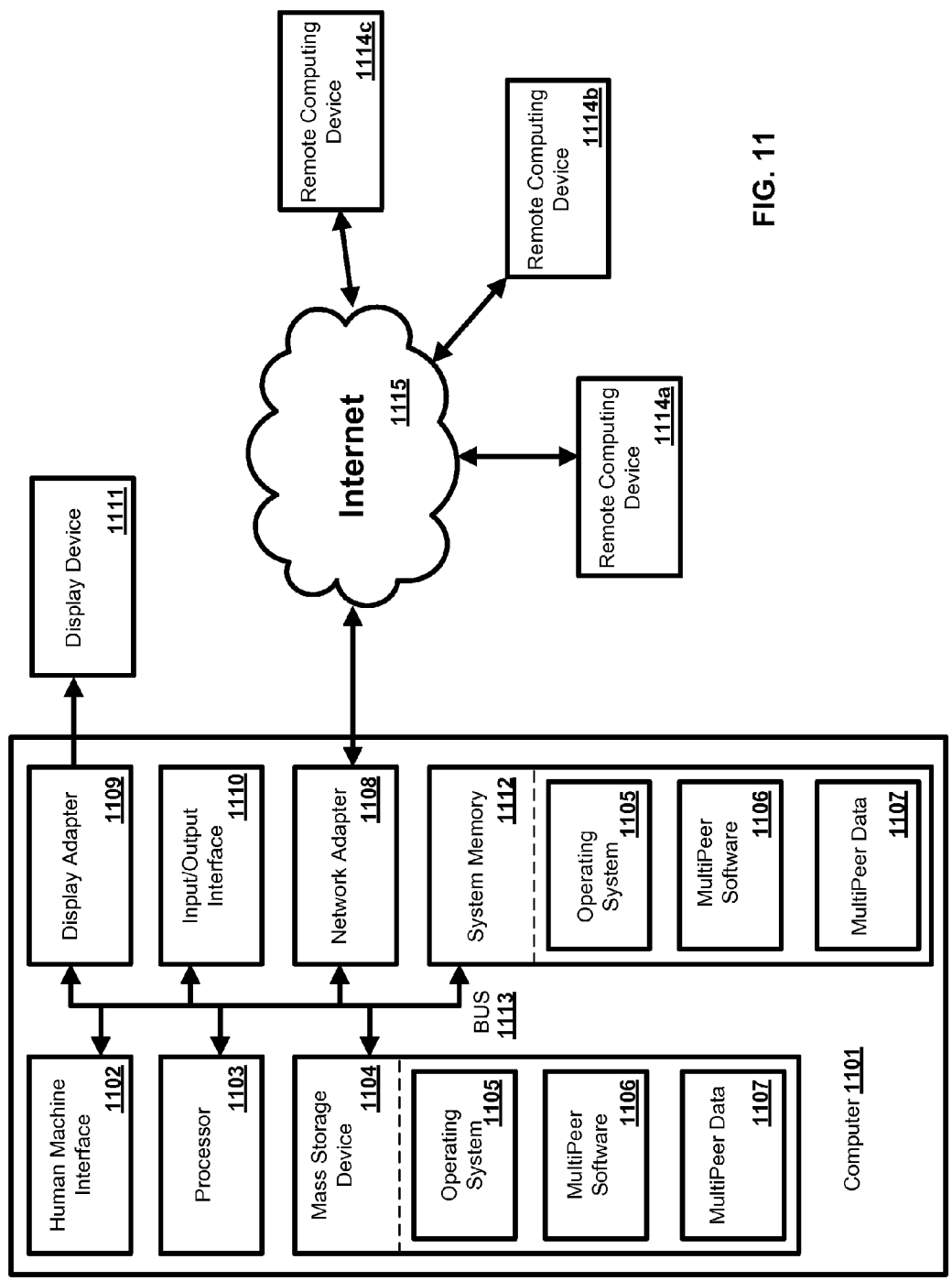
FIG. 11 is an exemplary system environment.

In another aspect, provided are systems operating according to one or more of the methods provided herein. The systems can comprise one or a plurality of computing devices for performing one or more steps of the methods. One skilled in the art will appreciate that this is a functional description and that the respective functions can be performed by software, hardware, or a combination of software and hardware. FIG. 11 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the system and method comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed system and method can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed method can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the system and method disclosed herein can be implemented via a general-purpose computing device in the form of a computer 1101. The components of the computer 1101 can comprise, but are not limited to, one or more processors or processing units 1103, a system memory 1112, and a system bus 1113 that couples various system components including the processor 1103 to the system memory 1112. In the case of multiple processing units 1103, the system can utilize parallel computing.

The system bus 1113 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like.

The bus 1113, and all buses specified in this description can also be implemented over a wired or wireless network connection and each of the subsystems, including the processor 1103, a mass storage device 1104, an operating system 1105, MultiPeer software 1106, MultiPeer data 1107, a network adapter 1108, system memory 1112, an Input/Output Interface 1110, a display adapter 1109, a display device 1111, and a human machine interface 1102, can be contained within one or more remote computing devices 1114a,b,c at physically separate locations, connected through buses of this form, in effect implementing a fully distributed system.

The computer 1101 typically comprises a variety of computer readable media. Exemplary readable media can be any available media that is accessible by the computer 1101 and comprises, for example and not meant to be limiting, both volatile and non-volatile media, removable and non-removable media. The system memory 1112 comprises computer readable media in the form of volatile memory, such as random access memory (RAM), and/or non-volatile memory, such as read only memory (ROM). The system memory 1112 typically contains data such as MultiPeer data 1107 and/or program modules such as operating system 1105 and MultiPeer software 1106 that are immediately accessible to and/or are presently operated on by the processing unit 1103.

In another aspect, the computer 1101 can also comprise other removable/non-removable, volatile/non-volatile computer storage media. By way of example, FIG. 11 illustrates a mass storage device 1104 which can provide non-volatile storage of computer code, computer readable instructions, data structures, program modules, and other data for the computer 1101. For example and not meant to be limiting, a mass storage device 1104 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 1104, including by way of example, an operating system 1105 and MultiPeer software 1106. Each of the operating system 1105 and MultiPeer software 1106 (or some combination thereof) can comprise elements of the programming and the MultiPeer software 1106. MultiPeer data 1107 can also be stored on the mass storage device 1104. MultiPeer data 1107 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 1101 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processing unit 1103 via a human machine interface 1102 that is coupled to the system bus 1113, but can be connected by other interface and bus structures, such as a parallel port, game port, an IEEE 1394 Port (also known as a Firewire port), a serial port, or a universal serial bus (USB).

In yet another aspect, a display device 1111 can also be connected to the system bus 1113 via an interface, such as a display adapter 1109. It is contemplated that the computer 1101 can have more than one display adapter 1109 and the computer 1101 can have more than one display device 1111. For example, a display device can be a monitor, an LCD (Liquid Crystal Display), or a projector. In addition to the display device 1111, other output peripheral devices can comprise components such as speakers (not shown) and a printer (not shown) which can be connected to the computer 1101 via Input/Output Interface 1110. Any step and/or result of the methods can be output in any form to an output device. Such output can be any form of visual representation, including, but not limited to, textual, graphical, animation, audio, tactile, and the like.

The computer 1101 can operate in a networked environment using logical connections to one or more remote computing devices 1114a,b,c. By way of example, a remote computing device can be a personal computer, portable computer, a server, a router, a network computer, a peer device or other common network node, and so on. Logical connections between the computer 1101 and a remote computing device 1114a,b,c can be made via a local area network (LAN) and a general wide area network (WAN). Such network connections can be through a network adapter 1108. A network adapter 1108 can be implemented in both wired and wireless environments. Such networking environments are conventional and commonplace in offices, enterprise-wide computer networks, intranets, and the Internet 1115.

For purposes of illustration, application programs and other executable program components such as the operating system 1105 are illustrated herein as discrete blocks, although it is recognized that such programs and components reside at various times in different storage components of the computing device 1101, and are executed by the data processor(s) of the computer. An implementation of MultiPeer software 1106 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any method or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications are referenced. The disclosures of these publications in their entireties are hereby incorporated by reference into this application in order to more fully describe the state of the art to which the methods and systems pertain.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method for creating an optimal set of reflector peers, comprising:
    detecting a plurality of reflector peers;
    generating a combined metric construction factor for two or more reflector peers of the plurality of reflector peers, wherein generating a combined metric construction factor comprises receiving, for the two or more reflector peers, one or more of a servicing load metric, a link capacity metric, a proximity metric, an Internet Service Provider (ISP) metric, a Network Address Translator (NAT) metric, and a cache correlation metric, and wherein generating a combined metric construction factor comprises normalizing one or more of the servicing load metric, link capacity metric, proximity metric, ISP metric, NAT metric, and cache correlation metric according to $V_{ij}'=V_{ij}/Max_j$, wherein the value of metric j of peer i is denoted by $V_{ij}$ and $Max_j$ is the maximum value of all peers for metric j;
    selecting a pre-determined number of reflector peers based on the generated combined metric construction factor; and
    establishing the selected reflector peers as the optimal set of reflector peers.

2. The method of claim 1, wherein generating a combined metric construction factor for each of the plurality of reflector peers comprises performing initial peer assignment on the plurality of reflector peers.

3. The method of claim 2, wherein performing initial peer assignment on the plurality of reflector peers comprises:
    ranking the plurality of reflector peers based on one or more of the servicing load metric, link capacity metric, proximity metric, ISP metric, and NAT metric;
    selecting a top predetermined number of peers from each of the one or more metrics; and
    establishing the selected reflector peers as the optimal set of reflector peers.

4. The method of claim 1, wherein retrieving a servicing load metric comprises determining a number of peers served by each peer.

5. The method of claim 1, wherein retrieving a link capacity metric comprises actively probing to determine a minimum link capacity of two peers away from each peer.

6. The method of claim 1, wherein retrieving a proximity metric comprises determining an Internet Protocol (IP) address for the two or more reflector peers of the plurality of reflector peers and correlating each IP address with an IP address geo-location database to determine a physical location for the two or more reflector peers of the plurality of reflector peers.

7. The method of claim 1, wherein retrieving an Internet Service Provider (ISP) metric comprises actively probing to determine a route taken by data packets and extracting ISP information.

8. The method of claim 1, wherein retrieving a NAT metric comprises:
    determining whether each of the two or more reflector peers is behind a NAT device; and
    if a peer is behind a NAT device, determining a number of peers behind the NAT device.

9. The method of claim 1, wherein generating a combined metric construction factor comprises:
    applying a weight to each normalized metric value; and
    for each of the plurality of reflector peers, adding the weighted normalized metric values associated with that peer.

10. The method of claim 1, wherein the cache correlation metric is determined based on receipt of one data packet.

11. The method of claim 1, wherein the cache correlation metric is determined based on a receipt of a plurality of data packets, wherein the cache correlation metric is updated according to $Cor_{cur\_i}=e*Cor_{old\_i}+(1-e)*Cor_{cur\_i}$, where in $Cor_{cur\_i}$ represents a current cache correlation metric, $Cor_{old\_i}$ represents a previous cache correlation metric, and e represents a weighting factor, $Cor_{cur\_i}=1$ if a current packet is correlated between two reflector peers, otherwise $Cor_{cur\_i}=0$.

12. The method of claim 1, wherein the method is periodically repeated.

13. The method of claim 1, wherein the method is repeated based on the occurrence of a network event.

14. The method of claim 13, wherein the network event comprises one or more of, network performance levels dropping below a threshold, offline reflector peers, data transmissions occurring primarily between a subset of the set of optimal reflector peers, and network performance levels increasing beyond a threshold.

15. A system for creating an optimal set of reflector peers, comprising:
    a plurality of reflector processors, wherein one of the plurality of reflector processors is configured for
    detecting a plurality of reflector processors;
    generating a combined metric construction factor for two or more reflector processors of the plurality of reflector processors, wherein generating a combined metric construction factor comprises receiving, for the two or more reflector processors, one or more of a servicing load metric, a link capacity metric, a proximity metric, an Internet Service Provider (ISP) metric, a Network Address Translator (NAT) metric, and a cache correlation metric, and wherein generating a combined metric construction factor comprises normalizing one or more of the servicing load metric, link capacity metric, proximity metric, ISP metric, NAT metric, and cache correlation metric according to $V_{ij}'=V_{ij}/Max_j$, wherein the value of metric j of peer i is denoted by $V_{ij}$ and $Max_j$ is the maximum value of all peers for metric j.

selecting a pre-determined number of reflector processors based on the generated combined metric construction factor; and establishing the selected reflector processors as the optimal set of reflector peers.

16. A system for creating an optimal set of reflector peers, comprising:

a plurality of reflector processors, wherein one of the plurality of reflector processors is configured for detecting a plurality of reflector processors;

retrieving one or more of a servicing load metric, a link capacity metric, a proximity metric, and an Internet Service Provider (ISP) metric for two or more of the plurality of reflector processors;

determining a cache correlation metric for the two or more of the plurality of reflector processors;

normalizing one or more of the metrics according to $V_{ij}'=V_{ij}/Max_j$, wherein the value of metric j of peer i is denoted by $V_{ij}$ and $Max_j$ is the maximum value of all peers for metric j;

ranking the two or more of the plurality of reflector processors based on one or more of the normalized metrics;

selecting a top predetermined number of processors from each of the one or more metrics; and establishing the selected reflector processors as the optimal set of reflector peers.

17. A method for creating an optimal set of reflector peers, comprising:

detecting a plurality of reflector peers;

retrieving one or more of a servicing load metric, a link capacity metric, a proximity metric, and an Internet Service Provider (ISP) metric for two or more of the plurality of reflector peers;

determining a cache correlation metric for the two or more of the plurality of reflector peers;

normalizing one or more of the metrics according to $V_{ij}'=V_{ij}/Max_j$, wherein the value of metric j of peer i is denoted by $V_{ij}$ and $Max_j$ is the maximum value of all peers for metric j;

ranking the two or more of the plurality of reflector peers based on one or more of the normalized metrics;

selecting a top predetermined number of peers from each of the one or more metrics; and establishing the selected reflector peers as the optimal set of reflector peers.

18. The method of claim 17, wherein retrieving a servicing load metric comprises determining a number of peers served by each peer.

19. The method of claim 17, wherein retrieving a link capacity metric comprises actively probing to determine a minimum link capacity of two peers away from each peer.

20. The method of claim 17, wherein retrieving a proximity metric comprises determining an Internet Protocol (IP) address for each the plurality of reflector peers and correlating each IP address with an IP address geo-location database to determine a physical location for each of the plurality of reflector peers.

21. The method of claim 17, wherein retrieving an Internet Service Provider (ISP) metric comprises actively probing to determine a route taken by data packets and extracting ISP information.

22. The method of claim 17, wherein the cache correlation metric is determined based on receipt of a plurality of data packets, wherein the cache correlation metric is updated according to $Cor_{cur\_i}=e*Cor_{old\_i}+(1-e)*Cor_{cur\_i}$, wherein $Cor_{cur\_i}$ represents a current cache correlation metric, $Cor_{old\_i}$ represents a previous cache correlation metric, and e represents a weighting factor, $Cor_{curi}=1$ if a current packet is correlated between two reflector peers, otherwise $Cor_{cur\_i}=0$.

23. The method of claim 17, further comprising determining a NAT metric and ranking the plurality of reflector peers based on one or more of the servicing load metric, link capacity metric, proximity metric, ISP metric, cache correlation metric, and NAT metric.

24. The method of claim 23, wherein retrieving a NAT metric for each of the plurality of peers comprises:

determining whether each peer is behind a NAT device; and if a peer is behind a NAT device, determining a number of peers behind the NAT device.

25. The method of claim 17, further comprising:

generating a combined metric construction factor for each of the plurality of reflector peers; and adjusting the optimal set of reflector peers based on the combined metric construction factor.

26. The method of claim 25, wherein generating a combined metric construction factor for each of the plurality of reflector peers comprises:

applying a weight to each normalized metric value; and for each of the plurality of reflector peers, adding the weighted normalized metric values associated with that peer.

27. The method of claim 17, wherein the method is periodically repeated.

28. The method of claim 17, wherein the method is repeated based on the occurrence of a network event.

29. The method of claim 28, wherein the network event comprises one or more of, network performance levels dropping below a threshold, offline reflector peers, data transmissions occurring primarily between a subset of the set of optimal reflector peers, and network performance levels increasing beyond a threshold.

30. A system for creating an optimal set of reflector peers, comprising:

a plurality of reflector processors, wherein one of the plurality of reflector processors is configured for detecting a plurality of reflector processors;

receiving, for two or more reflector processors of the plurality of reflector processors, one or more of a servicing load metric, a link capacity metric, a proximity metric, an Internet Service Provider (ISP) metric, and a Network Address Translator (NAT) metric;

ranking the plurality of reflector processors based on one or more of the servicing load metric, link capacity metric, proximity metric, ISP metric, and NAT metric;

selecting a top predetermined number of processors based on one or more of the metrics;

establishing the selected reflector processors as the optimal set of reflector peers;

determining a cache correlation metric for the two or more reflector processors of the plurality of reflector processors, wherein the cache correlation metric is determined according to $Cor_{cur\_i}=e*Cor_{old\_i}+(1-e)*Cor_{cur\_i}$, wherein $Cor_{cur\_i}$ represents a current cache correlation metric, $Cor_{old\_i}$ represents a previous cache correlation metric, and e represents a weighting factor, $Cor_{cur\_i}=1$ if a current packet is correlated between two reflector peers, otherwise $Cor_{cur\_i}=0$; and adjusting the optimal set of reflector peers based on the cache correlation metric.

31. A method for creating an optimal set of reflector peers, comprising:

detecting a plurality of reflector peers;

receiving, for two or more reflector peers of the plurality of reflector peers, one or more of a servicing load metric, a link capacity metric, a proximity metric, an Internet Service Provider (ISP) metric, and a Network Address Translator (NAT) metric;

ranking the plurality of reflector peers based on one or more of the servicing load metric, link capacity metric, proximity metric, ISP metric, and NAT metric;

selecting a top predetermined number of peers based on one or more of the metrics;

establishing the selected reflector peers as the optimal set of reflector peers;

determining a cache correlation metric for the two or more reflector peers of the plurality of reflector peers, wherein the cache correlation metric is determined according to $Cor_{cur\_i} = e*Cor_{old\_i} + (1-e)*Cor_{cur\_i}$, wherein $Cor_{cur\_i}$ represents a current cache correlation metric, $Cor_{old\_i}$ represents a previous cache correlation metric, and e represents a weighting factor, $Cor_{cur\_i}=1$ if a current packet is correlated between two reflector peers, otherwise $Cor_{cur\_i}=0$; and adjusting the optimal set of reflector peers based on the cache correlation metric.

32. The method of claim 31, further comprising:
determining a combined metric construction factor for the two or more reflector peers of the plurality of reflector peers based on the servicing load metric, link capacity metric, proximity metric, ISP metric, cache correlation metric, and NAT metric; and adjusting the optimal set of reflector peers based on the combined metric construction factors.

33. The method of claim 31, wherein the method is repeated based on the occurrence of a network event.

34. The method of claim 33, wherein the network event comprises one or more of, network performance levels dropping below a threshold, offline reflector peers, data transmissions occurring primarily between a subset of the set of optimal reflector peers, and network performance levels increasing beyond a threshold.

* * * * *

UNITED STATES PATENT AND TRADEMARK OFFICE
CERTIFICATE OF CORRECTION

PATENT NO.        : 8,589,539 B2                                            Page 1 of 1
APPLICATION NO.   : 12/989601
DATED             : November 19, 2013
INVENTOR(S)       : Sivakumar et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 590 days.

Signed and Sealed this
Twenty-second Day of September, 2015

Michelle K. Lee
*Director of the United States Patent and Trademark Office*